(12) United States Patent
Engquist

(10) Patent No.: US 10,612,575 B2
(45) Date of Patent: *Apr. 7, 2020

(54) SANDWICH PANEL JOINTS AND METHODS FOR JOINING SANDWICH PANELS

(71) Applicant: The Boeing Company, Chicago, IL (US)

(72) Inventor: Bryan S. Engquist, Kirkland, WA (US)

(73) Assignee: The Boeing Company, Chicago, IL (US)

(*) Notice: Subject to any disclaimer, the term of this patent is extended or adjusted under 35 U.S.C. 154(b) by 88 days.

This patent is subject to a terminal disclaimer.

(21) Appl. No.: 15/811,267

(22) Filed: Nov. 13, 2017

(65) Prior Publication Data

US 2018/0066686 A1 Mar. 8, 2018

Related U.S. Application Data

(63) Continuation of application No. 15/301,929, filed as application No. PCT/US2014/039672 on May 28, 2014, now Pat. No. 9,835,189.

(51) Int. Cl.
*B29C 65/48* (2006.01)
*B29C 65/52* (2006.01)
(Continued)

(52) U.S. Cl.
CPC ........... *F16B 5/01* (2013.01); *B29C 65/48* (2013.01); *B29C 65/50* (2013.01); *B29C 65/522* (2013.01);
(Continued)

(58) Field of Classification Search
CPC .... F16B 5/01; F16B 11/006; B29C 66/72525; B29C 66/543; B29C 66/7212; B29K 2307/04
(Continued)

(56) References Cited

U.S. PATENT DOCUMENTS

| 3,429,023 A * | 2/1969 | Blythe ................. B64C 3/00 156/211 |
| 4,917,747 A | 4/1990 | Chin et al. |
| 2013/0071604 A1 | 3/2013 | Lemieux et al. |

FOREIGN PATENT DOCUMENTS

| EP | 0288195 | 7/1991 |
| EP | 0830488 | 3/2007 |

(Continued)

OTHER PUBLICATIONS

Machine-generated English translation of the abstract of FR 2711744, downloaded from Espacenet.com on Oct. 3, 2016.
(Continued)

*Primary Examiner* — Tri V Nguyen
(74) *Attorney, Agent, or Firm* — Dascenzo Intellectual Property Law, P.C.

(57) ABSTRACT

Joints for joining panels together, such as for joining honeycomb sandwich panels used in aerospace applications, and methods of joining said panels are disclosed. In some examples of disclosed joints, a first panel and a second panel can be joined together to form a joint. The first panel can be a flat panel that includes a rabbet formed along a first longitudinal edge, and the second panel can be a curved panel that includes a notch formed along a second longitudinal edge. In forming the joint, a portion of the rabbet can be positioned within the notch, and the flat panel and curved panel can be oriented at a non-parallel and non-perpendicular angle to one another. Adhesive can be applied along the rabbet and/or the notch in order to secure the joint.

20 Claims, 9 Drawing Sheets

(51) Int. Cl.
*F16B 5/01* (2006.01)
*F16B 11/00* (2006.01)
*B29C 65/50* (2006.01)
*B29C 65/00* (2006.01)
*B64C 1/00* (2006.01)
B29L 31/30 (2006.01)
B64D 11/00 (2006.01)

(52) U.S. Cl.
CPC .... *B29C 66/0224* (2013.01); *B29C 66/02241* (2013.01); *B29C 66/02245* (2013.01); *B29C 66/12445* (2013.01); *B29C 66/12463* (2013.01); *B29C 66/12469* (2013.01); *B29C 66/225* (2013.01); *B29C 66/322* (2013.01); *B29C 66/4342* (2013.01); *B29C 66/7212* (2013.01); *B29C 66/72525* (2013.01); *B64C 1/00* (2013.01); *F16B 11/006* (2013.01); *B29C 65/4835* (2013.01); *B29C 66/30325* (2013.01); *B29C 66/543* (2013.01); *B29L 2031/3076* (2013.01); *B64C 2001/0072* (2013.01); *B64D 11/003* (2013.01)

(58) Field of Classification Search
USPC .................................................. 428/116–118
See application file for complete search history.

(56) References Cited

FOREIGN PATENT DOCUMENTS

FR 2711744 5/1995
GB 2340065 2/2000

OTHER PUBLICATIONS

International Search Report and Written Opinion for priority International Application No. PCT/US2014/039672, dated Feb. 3, 2015.

* cited by examiner

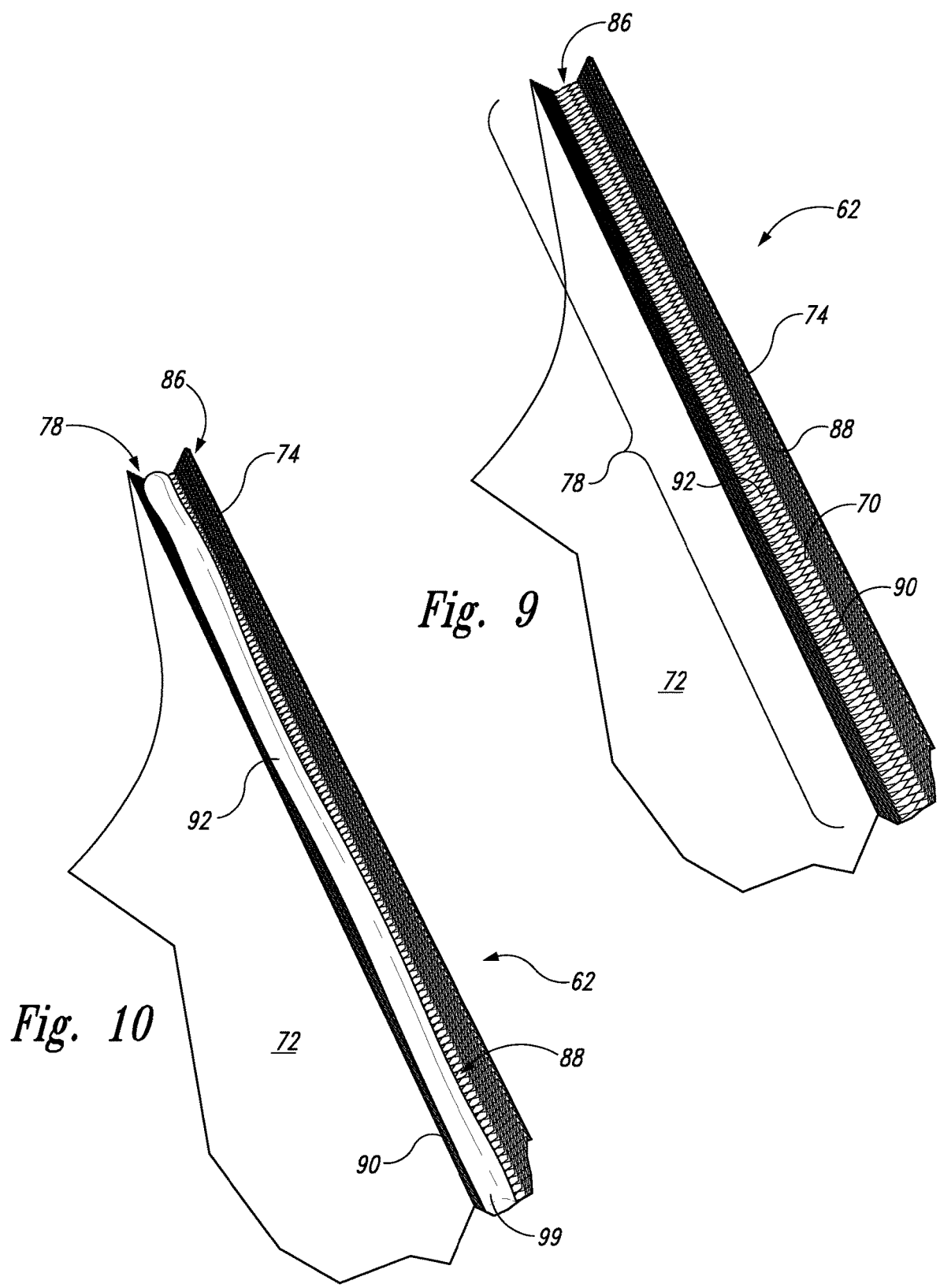

SANDWICH PANEL JOINTS AND METHODS FOR JOINING SANDWICH PANELS

RELATED APPLICATIONS

This application claims priority to U.S. patent application Ser. No. 15/301,929, entitled "SANDWICH PANEL JOINTS AND METHODS FOR JOINING SANDWICH PANELS," filed on Oct. 4, 2016, which claims priority to PCT Application No. PCT/US2014/039672, entitled "SANDWICH PANEL JOINTS AND METHODS FOR JOINING SANDWICH PANELS," filed on May 28, 2014, and the complete disclosures of which are hereby incorporated by reference.

FIELD

The present disclosure relates to joints for joining panels, such as for joining honeycomb sandwich panels used in aerospace applications, and methods of joining said panels.

BACKGROUND

Honeycomb sandwich panels (e.g., a honeycomb core structure sandwiched between two layers of material, or skins) are often used in the construction of aircraft, because they have high strength to weight ratios. Depending on the specific location and application of a honeycomb structure in an aircraft, two or more honeycomb sections may be required and may be joined or bonded together to define a larger honeycomb structure. In some applications, such as joining panels in constructing overhead storage bins for an aircraft (which can also be referred to as a bin bucket or stow bin), a curved sandwich panel is joined to a straight sandwich panel.

In a conventional method of joining a flat panel to a curved panel, a joint is created by machining interlocking "fingers" in the two panels to be joined, and adhering the panels together. A first panel 100 (FIG. 1A) has a honeycomb core 104 sandwiched between a first skin layer 102 and a second skin layer 103. Portions of panel 100 are machined to remove areas of skin layer 102 and some or all of core 104, thereby forming a plurality of fingers 105 and cut-outs, or recesses 106 and resulting in a staggered edge 107. In some techniques, substantially all of core 104 is removed from areas of each recess 106, such as shown in FIG. 1B. A manual scraping step is often performed to remove remnants of core 104 from portions 108 of each recess 106. Such scraping can result in areas of the second skin layer 103 having no core 104 attached, but can be difficult and time-consuming to perform.

A second panel 120 (FIG. 2) also has a honeycomb core 122 sandwiched between a first skin layer 124 and a second skin layer 126. Second panel 120 is also machined to form a staggered edge 127 having alternating fingers 128 and recesses 130. Each finger 128 of panel 120 is sized to correspond to and fit within a respective recess 106 of panel 100, resulting in a staggered joint 132 (FIG. 3). Likewise, each finger 105 of panel 100 is sized to correspond to and fit within a respective recess 130 of panel 120. FIG. 4 shows a schematic view of joint 132. Adhesive 134 is applied along staggered edge 107 and/or staggered edge 127, and the respective fingers and recesses of the two panels are interlocked with one another to secure the joint together.

Conventional manufacturing techniques may result in inconsistent production results, rippling, and/or curling inwards of one or both of the panels. Such curling or rippling often results in buckling and/or wavy internal joints in the finished product (e.g., aircraft storage bin). Such flawed joints may be visible to airline passengers, and thus manufacturers often must scrap or dispose of such defective parts, wasting time and money, and/or attempt to mitigate the curling, thereby increasing production costs and time. Mitigation of the curling is often not entirely effective to improve the visual quality of the resulting parts and also increases production times. Thus, there remains a need for an improved method of joining honeycomb sandwich panels.

SUMMARY

Joints for joining panels together, such as for joining honeycomb sandwich panels used in aerospace applications, and methods of joining said panels are disclosed. In some examples of disclosed joints, a first panel and a second panel can be joined together to form a joint. The first panel can be a flat panel that includes a rabbet formed along a first longitudinal edge, and the second panel can be a curved panel that includes a notch formed along a second longitudinal edge. In forming the joint, a portion of the rabbet can be positioned within the notch, and the flat panel and curved panel can be oriented at a non-parallel and non-perpendicular angle to one another. Adhesive can be applied along the rabbet and/or the notch in order to secure the joint.

In some examples, a rabbet can be formed in the first panel by machining away a strip along the first longitudinal edge, resulting in a lip that extends from a wall, the lip containing a small thickness of core and one layer of skin underneath. The notch can be machined into the second longitudinal edge of the second panel, and may be, for example, a generally V-shaped or generally U-shaped notch. In some examples, the notch may include three notch surfaces, or faces, where a parallel face is parallel to one of the skins of the second panel, an angled face is arranged to form an acute angle with the other skin of the second panel, and the third notch face connects the parallel face and the angled face to one another. The lip of the rabbet of the first panel can be positioned on the inside of the notch such that it is adjacent (e.g., in contact with, or close to) the angled face of the notch. A top edge of the wall of the rabbet can intersect with the parallel face of the notch, thereby creating a space substantially encapsulated by the rabbet and the notch. The adhesive may be substantially contained within this space, thereby joining the first and second panels together.

Disclosed joints and methods of forming joints can be particularly useful for joining a flat panel to a curved panel, such as is performed in the manufacturing of overhead storage bins for passenger aircrafts. As compared to prior art techniques, some presently disclosed methods can reduce production time, simplify assembly and cleaning processes, improve visual appearance of the resulting parts, eliminate steps such as scraping honeycomb core away from the panel, and/or eliminate or reduce the need to scrap parts due to defects in the joint formation.

BRIEF DESCRIPTION OF THE DRAWINGS

FIG. 9 is a perspective view of a portion of a second sandwich panel according to the present disclosure.

FIG. 10 is a perspective view of the sandwich panel of FIG. 9, with an adhesive applied.

DESCRIPTION

Figures 1A, 1B:
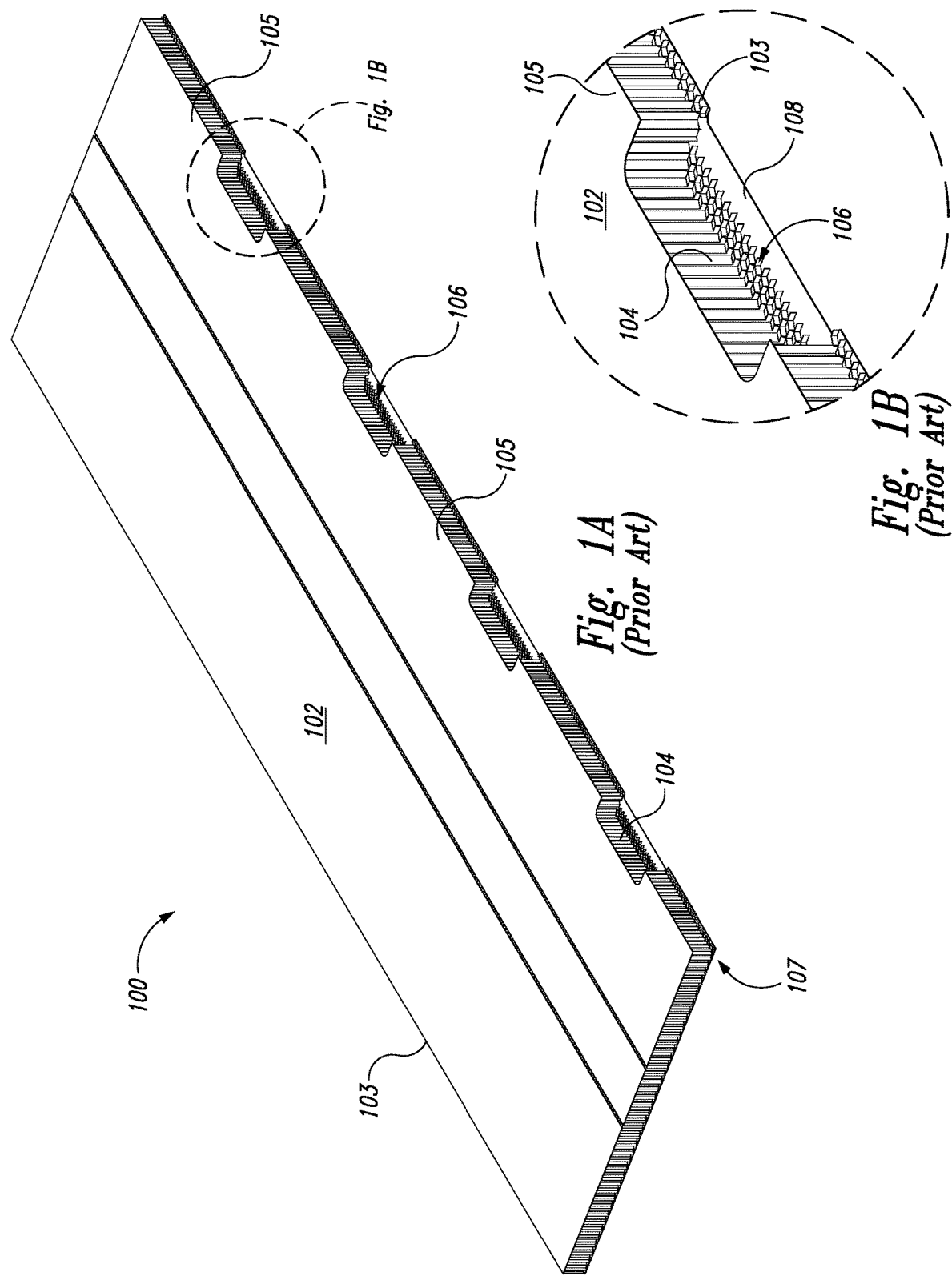
FIG. 1A is a perspective view of a prior art first sandwich panel having interlocking fingers machined along one edge.
FIG. 1B is a close-up of a portion of the prior art first sandwich panel of FIG. 1A.
Figure 2:
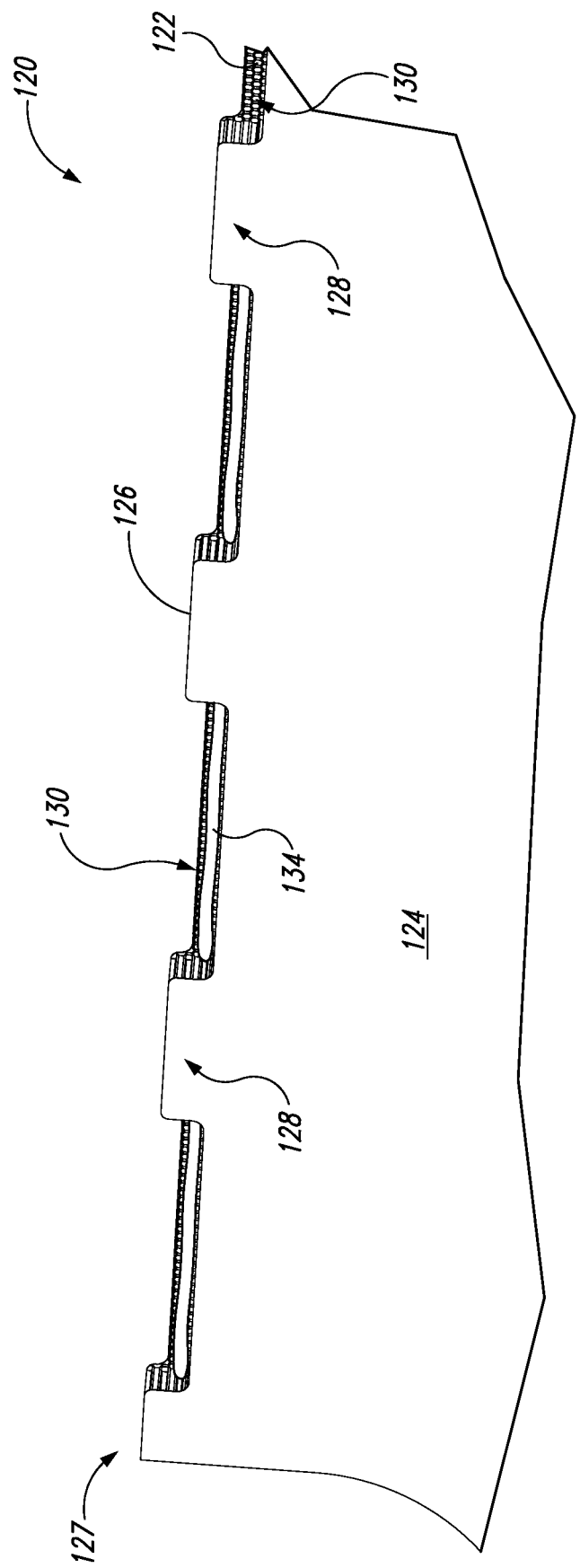
FIG. 2 is a perspective view of a prior art second sandwich panel having interlocking fingers machined along one edge.
Figure 3:
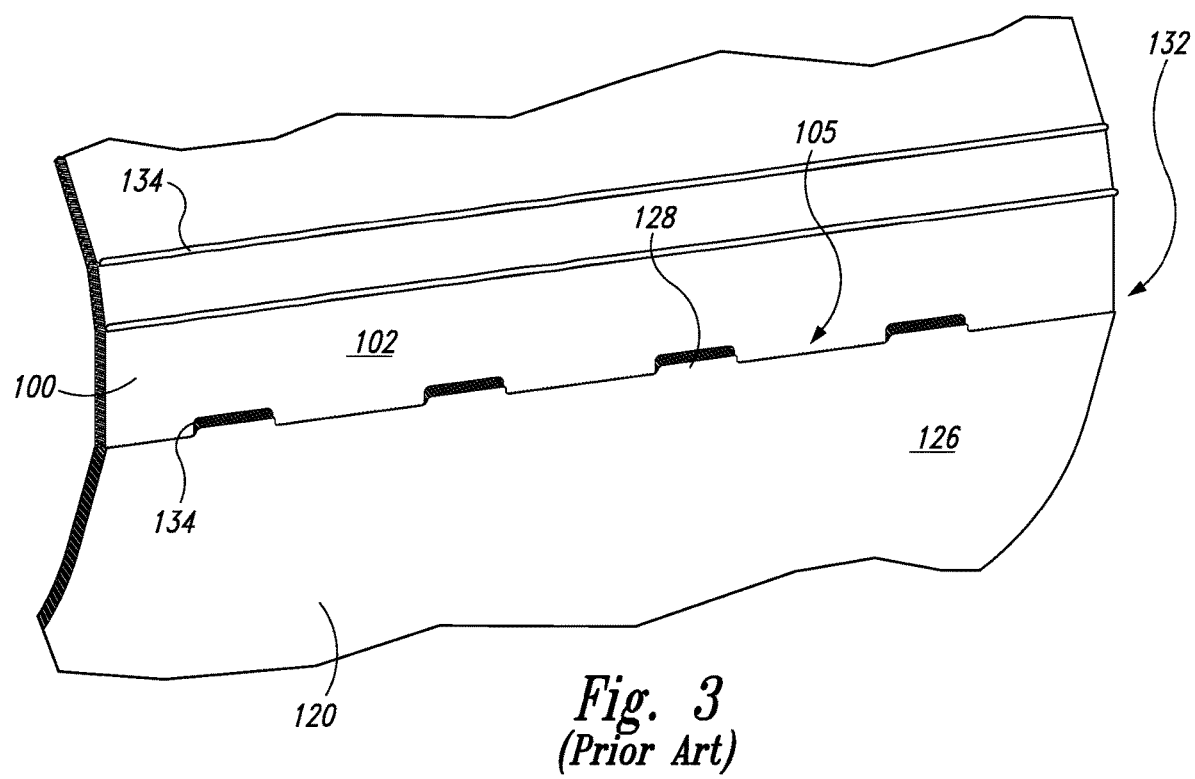
FIG. 3 is a perspective view of the prior art first sandwich panel of FIG. 1A joined together with the prior art second sandwich panel of FIG. 2 to form a prior art staggered joint.
Figure 4:
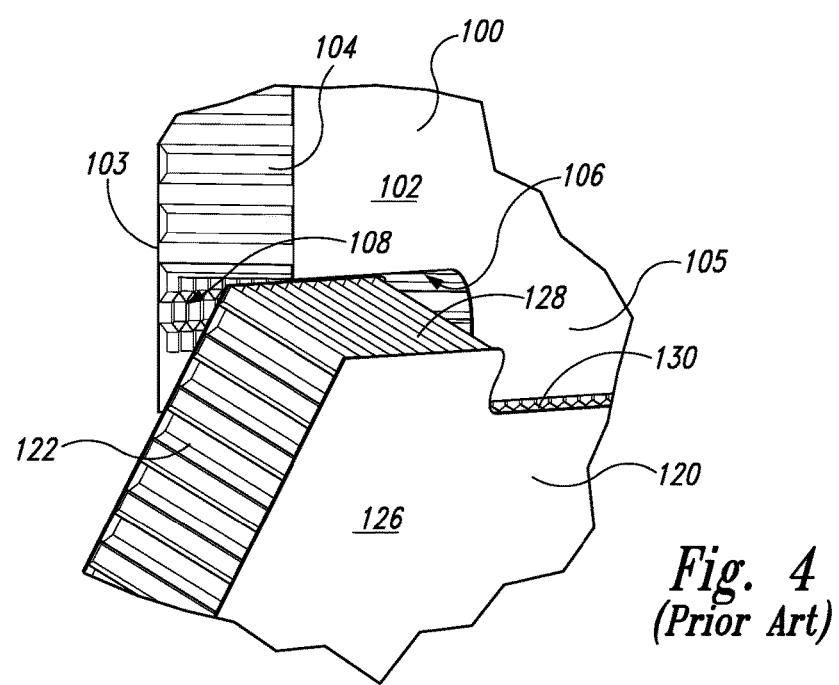
FIG. 4 is a schematic view of the joint of FIG. 3.
Figure 5:
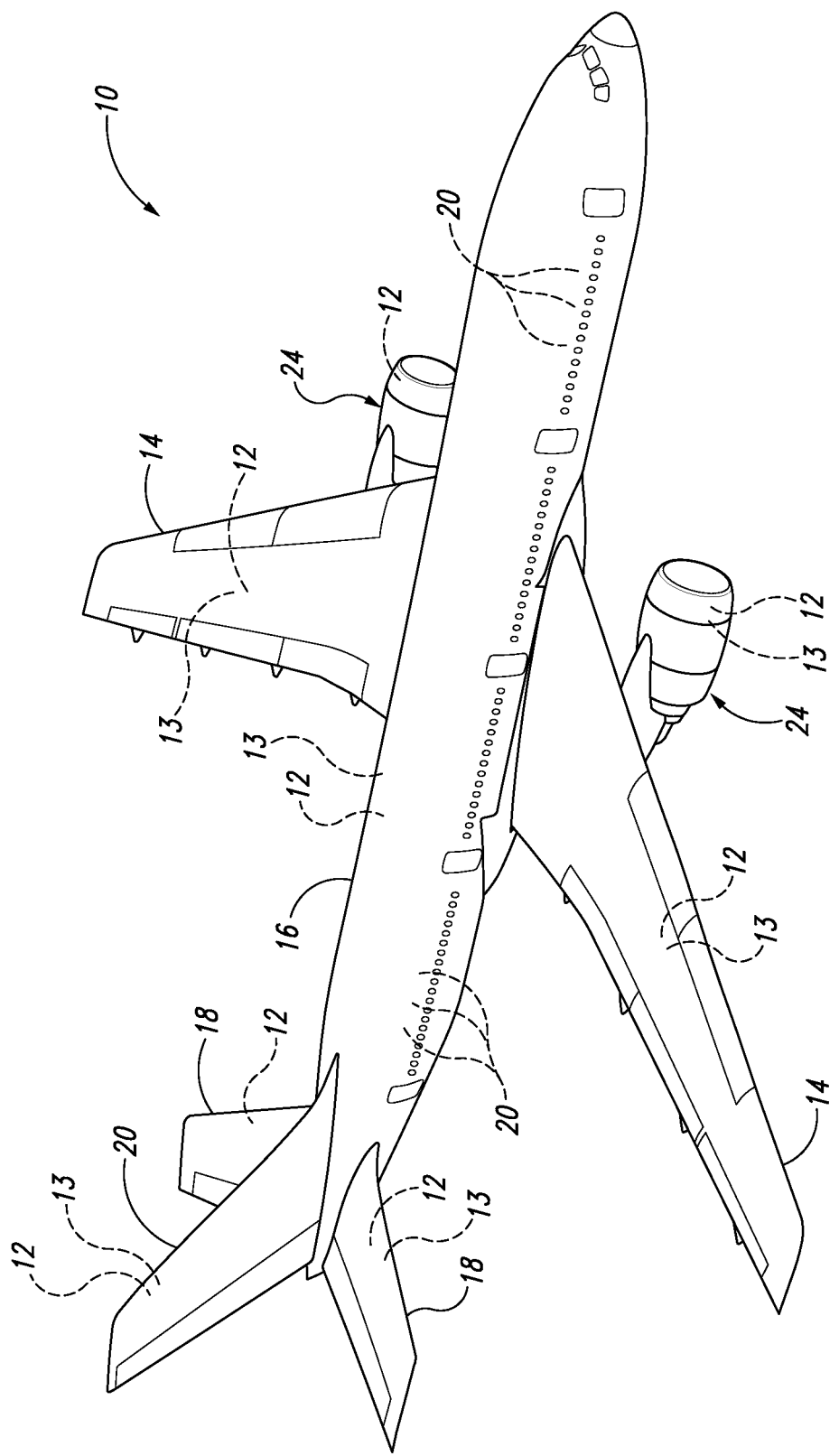
FIG. 5 is a perspective view of an illustrative, non-exclusive example of an aircraft.

In FIG. 5, an example of an aircraft 10 is generally illustrated. Aircraft 10 may take any suitable form, including commercial aircraft, military aircraft, or any other suitable aircraft. While FIG. 5 illustrates an aircraft 10 in the form of a fixed wing aircraft, other types and configurations of aircraft are within the scope of aircraft 10 according to the present disclosure, including (but not limited to) rotorcraft and helicopters.

An aircraft 10 includes one or more structures 12, which are structures that include one or more panels 13. Each panel 13 includes a core formed of a relatively lightweight material, such as a plurality of elongate cells, typically having hexagonal or rectangular cross-sections. Such cores may be referred to as honeycomb cores, but other shapes and configurations also may be used. While other cores, such as a corrugated structure and/or foam materials are also possible, examples described herein will be described with reference to honeycomb cores, and therefore structures 12 are also referred to herein as honeycomb structures 12. Panels 13 include two skins, one skin being positioned on each side of the honeycomb core, arranged to form a three-layer sandwich structure, and thus are also referred to herein as honeycomb sandwich panels 13, but panels 13 are not limited to such. The skins are typically rigid, with the honeycomb core spanning between the skins.

Honeycomb structures 12 are used in aerospace applications because of high strength to weight ratio. Honeycomb structures 12 may include one or more honeycomb sandwich panels 13, joints formed between two or more honeycomb sandwich panels 13, and/or three-dimensional structures formed using one or more honeycomb sandwich panels 13. As illustrative, non-exclusive examples, honeycomb structures 12 may be utilized in such aircraft structures as wings 14, fuselages 16, horizontal stabilizers 18, overhead storage bins 20, vertical stabilizers 22, and engine housings 24; however, other components of aircraft 10 additionally or alternatively may include honeycomb structures 12 such as honeycomb sandwich panels 13 and joints formed between two or more honeycomb sandwich panels 13.

Figure 6:
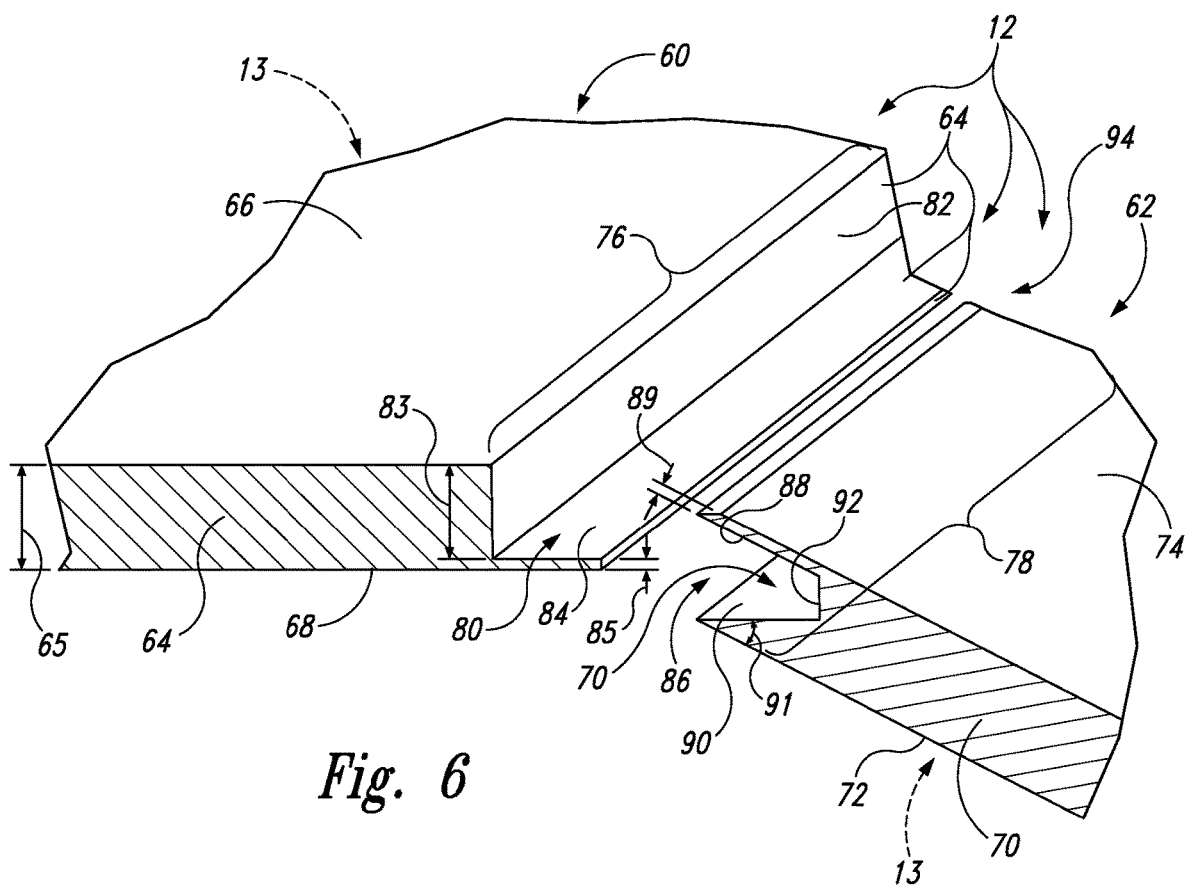
FIG. 6 is an exploded, schematic view of illustrative, non-exclusive examples of panels to be joined together according to the present disclosure.

FIG. 6 shows an exploded, schematic representation of illustrative, non-exclusive examples of joints 94 formed between two honeycomb structures 12 (e.g., joints 94 formed between two honeycomb sandwich panels 13) according to the present disclosure. For example, honeycomb structures 12 may include a first panel 60 and a second panel 62. First panel 60 may be composed of a first core structure 64 sandwiched between a first skin 66 ("skin," as used herein, also may be referred to as a "skin layer") and a second skin 68. Likewise, second panel 62 may be composed of a second core structure 70 sandwiched between a third skin 72 and a fourth skin 74. Core structures 64, 70 may be and/or include a honeycomb core structure and also may be referred to herein as honeycomb cores 64, 70 and/or cores 64, 70. Panels 60, 62 also may be referred to herein as "sandwich panels," and/or "honeycomb sandwich panels" and may be examples of honeycomb sandwich panels 13. However, panels 60, 62 are not required to be honeycomb sandwich panels 13.

In examples where first panel 60 and/or second panel 62 are examples of honeycomb sandwich panels 13, the honeycomb cores 64, 70 generally may include a plurality of elongate cells (e.g., hexagonal cells) arranged between two skins. In some examples, a honeycomb sandwich panel may include a plurality of elongate hexagonal cells arranged such that the longitudinal axis of the cells is perpendicular to the skins. Honeycomb cores 64, 70 for sandwich panels 60, 62 may be constructed from any suitable material, depending on the application therefore, including (but not limited to) aluminum, fiberglass, polypropylene, thermoplastic materials, metals, paper, paperboard, and fiber reinforced composite materials, such as aramid or carbon fiber reinforced polymers. Skins 66, 68, 72, 74 on either side of the cores 64, 70 may comprise, for example, fiberglass, carbon fiber, pre-impregnated fiberglass, pre-impregnated carbon fibers, resin, and/or any suitable coating or coatings, such as paint or polymer film materials, such as a polyvinyl fluoride film (e.g., Tedlar®).

First panel 60 may be any suitable size and shape for a given application. In some examples, first panel 60 may be a flat panel, such that first skin 66 is parallel to second skin 68 over the entire surface area of first panel 60, where each skin 66, 68 defines a flat plane. In some examples, first panel 60 may be a curved panel, where one or both of the first skin 66 and the second skin 68 are curved. In some examples, first skin 66 and second skin 68 (or portions thereof) may form concentric arcs. Similarly, second panel 62 may be a flat panel or a curved panel. In some examples, both first panel 60 and second panel 62 may be flat panels. In some examples, both first panel 60 and second panel 62 may be curved panels. In some examples, one of first panel 60 and second panel 62 may be a flat panel, while the other is a curved panel.

In order to form a joint between first panel 60 and second panel 62, each may have a portion of their respective cores 64, 70 removed along a longitudinal edge (e.g., first longitudinal edge 76 of first panel 60 and second longitudinal edge 78 of second panel 62). Longitudinal edges 76, 78 may be any edge of the respective panel 60, 62. In some examples, panels 60, 62 may be defined by four edges—two opposing edges oriented along the length of the panels and two opposing edges oriented along the width of the panels. In some examples, the "length" of the panel may be the longer of the two dimensions (e.g., the "length" or the panel may be greater than the "width" of the panel). In some examples, the "length" of the panel may be the lesser of the two dimensions, or may be substantially equal to the width (e.g., for a square panel). Longitudinal edges 76, 78 may be an edge along the "length" or "width" of the panels, according to the present disclosure.

A portion of first skin 66 and a portion of first core 64 may be removed along first longitudinal edge 76 to form a rabbet 80. Rabbet 80 may extend along the entire length of first longitudinal edge 76, or rabbet 80 may extend along a portion of the length of first longitudinal edge 76. In some examples, rabbet 80 may extend along a majority of the entire length of first longitudinal edge 76. For example, rabbet 80 may extend along almost the entire length of first longitudinal edge 76 except for small portions at one or both ends of first longitudinal edge 76.

Rabbet 80 may be defined by a wall 82 and a lip 84. In some examples, a portion of first core 64 and first skin 66 may be removed to form rabbet 80 such that a surface area of first skin 66 that corresponds to the surface area of lip 84 is removed. Further, a portion of first core 64 corresponding to the same surface area may be removed, thereby exposing lip 84. Lip 84 may extend perpendicularly from wall 82, and lip 84 may be parallel to second skin 68 and/or first skin 66. In some examples, lip 84 may extend at a non-perpendicular angle from wall 82 (e.g., at an acute or obtuse angle from wall 82) and lip 84 may not be parallel to second skin 68 and/or first skin 66.

First longitudinal edge 76 may be cut such that wall 82 is a vertical wall, oriented perpendicularly to first skin 66. In other examples, wall 82 may be non-perpendicular with respect to first skin 66. For example, first longitudinal edge 76 may be cut such that wall 82 is angled with respect to first skin 66. In some examples, wall 82 may form an acute angle with first skin 66 and cut deeper into the core 64, away from first longitudinal edge 76. In other examples, wall 82 may form an obtuse angle with first skin 66, terminating closer to first longitudinal edge 76 than where it originates at first skin 66. Wall 82 may extend from first skin 66 through a portion of first core 64, towards second skin 68. In some examples, wall 82 does not extend all the way to second skin 68, thereby leaving a portion of core 64 along lip 84 (e.g., a thickness 85 of core 64). In some examples, wall 82 may extend through the entire thickness of first core 64, from first skin 66 to second skin 68, leaving no core 64 on some or all of the surface of lip 84, with lip 84 being defined solely by second skin 68.

As shown in FIG. 6, first core 64 may have a total thickness 65. Wall 82 may have a wall thickness 83 and lip 84 may have a lip thickness 85, such that the total thickness 65 is equal to the sum of wall thickness 83 and lip thickness 85. In some examples, wall thickness 83 may be greater than lip thickness 85, such that wall 82 extends through a greater portion of first core 64 than lip 84. Lip 84 thus is formed by second skin 68 and a portion of first core 64 corresponding to lip thickness 85. Lip 84 also may be referred to as a shelf, or flange. Rabbet 80 also may be referred to as an edge having a shelf or lip extending therefrom, a right angle groove, or as an edge with an L-shaped cross-section.

A portion of second panel 62 may be removed along second longitudinal edge 78 in order to form a notch 86. Notch 86 also may be referred to as a channel 86, a groove 86, or a recess 86. Notch 86 may extend along the entire length of second longitudinal edge 78 as shown in FIG. 6. In other examples, notch 86 may extend along a portion of second longitudinal edge 78. In some examples, notch 86 may extend along a majority of the entire length of second longitudinal edge 78. For example, notch 86 may extend along almost the entire length of second longitudinal edge 78 except for small portions at one or both ends of second longitudinal edge 78. To form notch 86, a portion of third skin 72, fourth skin 74, and/or second core 70 may be removed from second panel 62 along at least a portion of second longitudinal edge 78.

Notch 86 may be formed by creating a plurality of surfaces or faces within the second honeycomb core 70. As used herein, the terms "surface" and "face" are not limited to smooth or flat surfaces or faces. For example, a surface or face can be formed by cutting into a honeycomb core (or otherwise removing a portion of a skin and underlying core), so that the honeycomb cells within a certain area or portion of the panel have a reduced height or thickness (the cells initially being elongated cells having a thickness extending from one skin to the other skin of the panel). This can result in a surface or face defined by a plurality of open, exposed cells (e.g., with no skin covering some of the cells), the resulting "surface" or "face" being generally defined by a plane arranged at an angle to the elongated walls of the cells. In other words, a portion of the core of a panel can define a "surface" or a "face" via ridges of cell walls and open spaces of the cells in some examples, rather than having a "surface" or "face" being limited to flat, or smooth surfaces or faces. In some examples, a surface or face is generally defined by a plane oriented at a perpendicular angle to the longitudinal axis of the cells (e.g., where a cut is made into the core that is perpendicular to the longitudinal axis of the cells, such as in examples with a lip that is parallel to a skin of the panel). In some examples, a surface or face generally is defined by a plane arranged at a 180° angle (e.g., parallel to) the longitudinal axis of the cells, such as in examples with a wall that is perpendicular to a skin of the panel). In some examples, a surface of face generally is defined by a plane arranged at a non-perpendicular and non-parallel angle to the longitudinal axis of the cells, such as with the angled face of the notch, or any other component of the rabbet or notch that is not formed perpendicular to or parallel to the panel skins. In any example, a non-smooth, non-uniform "surface" or "face" may be generally defined by a plurality of cut or partial cells, where the surface is formed by the ridges or cell walls, in combination with the open spaces of the exposed cells.

Notch 86 can generally be described as being V-shaped, U-shaped, or trapezoidal in some examples. Some notches 86 may include a parallel face 88, an angled face 90, and a third notch face 92 connecting parallel face 88 and angled face 90. Parallel face 88 may be parallel to fourth skin 74, and formed adjacent thereto. In some examples, parallel face 88 may be formed by a portion of fourth skin 74, such that all of second core 70 is removed along parallel face 88. In some examples, a small thickness of core 70 remains along parallel face 88 and is a parallel face thickness 89 of parallel face. Angled face 90 may be formed adjacent third skin 72, and may form a notch angle 91 with third skin 72. In some examples, notch angle 91 may be an acute angle. Notch angle 91 may be, for example, less than 90°, less than 60°, less than 45°, less than 30°, and/or less than 15°. Angled face 90 may originate at third skin 72 and terminate at third notch face 92. Parallel face 88 may originate at fourth skin 74 and terminate at third notch face 92.

First honeycomb core 64 and second honeycomb core 70 may be removed by any suitable technique to form rabbet 80 and notch 86, respectively. For example, first longitudinal edge 76 and second longitudinal edge 78 may be subject to one or more of cutting, milling, machining, grinding, laser cutting, lathing, plasma cutting, electric discharge machining, water-jet cutting, CNC machining, and/or any suitable method of removing portions of skins 66, 68, 72, 74 and/or honeycomb core layers 64, 70 to form rabbet 80 and notch 86.

An adhesive or bonding agent may be applied along at least a portion of rabbet 80 of first panel 60 and/or along at least a portion of notch 86 of second panel 62. Panels 60, 62 may then be brought together to form a joint along longitudinal edges 76, 78, such that rabbet 80 (e.g., at least a portion of lip 84) may be at least partially inserted into notch 86. The adhesive may be substantially contained within a space formed between notch 86 and rabbet 80. Any suitable adhesives may be used, including epoxy adhesives (e.g., two-part epoxy adhesives), film adhesives, foam adhesives, paste adhesives, spray adhesives, polyurethane adhesives, and/or any other bonding agent having a sufficient holding strength for a particular application.

Figure 7:
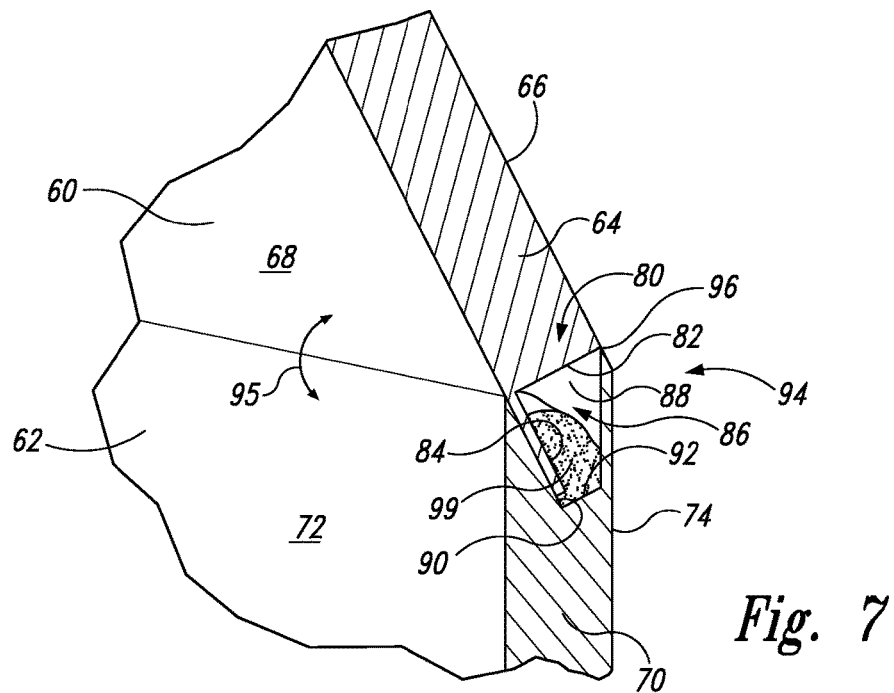
FIG. 7 is a schematic view of a panel joint according to the present disclosure, showing the first and second panels of FIG. 6 joined together.

FIG. 7 shows a schematic representation of first panel 60 and second panel 62 joined together to form joint 94 according to the present disclosure. First panel 60 and second panel 62 may be joined to such that they are oriented at a non-parallel, non-perpendicular angle with respect to one another. For example, first panel 60 and second panel 62 may be joined to form a joint angle 95. In some examples, joint angle 95 may be obtuse. For example, joint angle 95 may be greater than 90°, greater than 105°, greater than 120°, greater than 135°, greater than 150°, and/or greater than 165°.

As shown in FIG. 7, at least a portion of lip 84 of rabbet 80 of first panel 60 may be positioned at least partially within notch 86 of second panel 62. For example, lip 84 of rabbet 80 of first panel 60 may be positioned adjacent angled face 90 of notch 86. An engagement portion 98 of second skin 68 along lip 84 of rabbet 80 of first panel 60 may be inserted within notch 86 such that engagement portion 98 contacts angled face 90 of notch 86 of second panel 62, as shown in FIG. 7. In some examples, lip 84 may be inserted into notch 86 such that lip 84 contacts third notch face 92. In other examples, lip 84 may be inserted into notch 86 to a lesser extent, as shown in FIG. 7, such that lip 84 does not contact third notch face 92. In some examples, an intersection 96 of wall 82 and first skin 66 may be positioned adjacent parallel face 88 of notch 86. Accordingly, in some examples, there may be little or no honeycomb core exposed along joint 94 once first panel 60 and second panel 62 are brought together to form joint 94.

An adhesive 99 may be used to secure first panel 60 to second panel 62 to form joint 94. For example, as shown in FIG. 7, adhesive 99 may be applied or positioned in the space formed between rabbet 80 and notch 86 (e.g., as shown in FIG. 7, the space generally defined by lip 84, wall 82, parallel face 88, third notch face 92, and angled face 90). For example, adhesive 99 may be applied to at least a portion of rabbet 80 and/or notch 86 before first panel 60 and second panel 62 are brought together to form joint 94. In examples where adhesive 99 is applied to or placed on rabbet 80, adhesive 99 may be applied to wall 82 and/or lip 84. In examples where adhesive 99 is applied to or placed on notch 86, adhesive 99 may be applied to parallel face 88, third notch face 92, and/or angled face 90. In some examples, adhesive 99 may be substantially contained within the space formed between rabbet 80 and notch 86. In some examples, adhesive 99 may be present and/or applied to other areas of panels 60, 62, such as outside of the space formed by joint 94.

Panels and joints according to the present disclosure may be incorporated into a wide variety of machines and vehicles, such as, for example, in the manufacture of overhead storage bins for aircraft, such as passenger airplanes. The presently disclosed joints can have general applicability for any manufacturing technique requiring the joining of two or more honeycomb sandwich panels.

Turning now to FIGS. 8-11, illustrative non-exclusive examples of panels and joints are illustrated. Where appropriate, the reference numerals from the schematic illustrations of FIGS. 6-7 are used to designate corresponding parts of illustrated panels and joints, however, the examples of FIGS. 8-11 are non-exclusive and do not limit the disclosed panels and joints to the illustrated embodiments of FIGS. 8-11. That is, presently disclosed panels and joints are not limited to the specific embodiments illustrated in FIGS. 8-11, and examples disclosed herein may incorporate any number of the various aspects, configurations, characteristics, properties, etc. of joints and panels that are illustrated in and discussed with reference to the schematic representations of FIGS. 6-7 and/or the embodiments of FIGS. 1-5 and 8-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 8-11, however, it is within the scope of the present disclosure that the previously discussed features, variants, etc. may be utilized with these examples.

Figure 8:
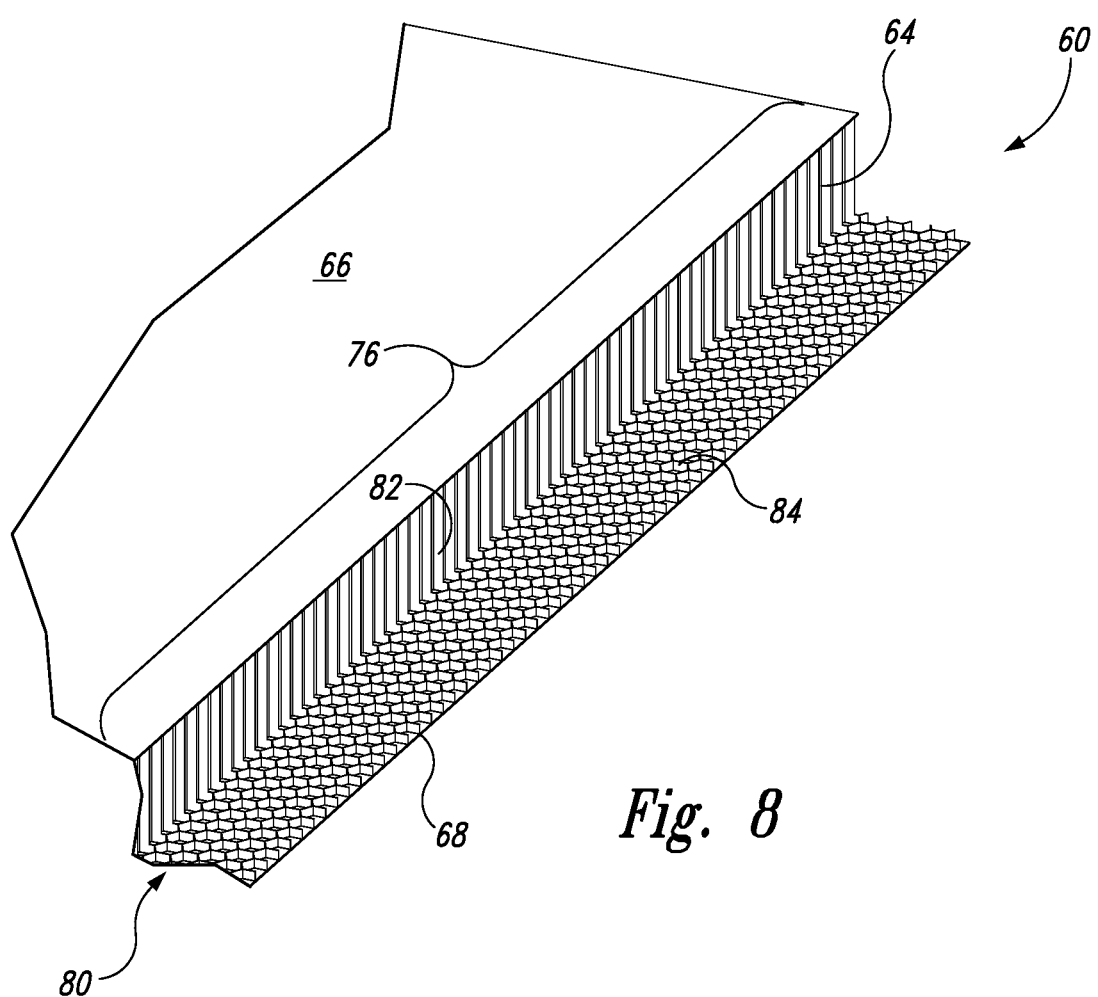
FIG. 8 is a perspective view of a portion of a first sandwich panel according to the present disclosure.

FIG. 8 shows an example of a first panel 60 having a rabbet 80 formed therein, according to the present disclosure. Honeycomb core 64 may be sandwiched between first skin 66 and second skin 68. Rabbet 80 may be formed along at least a portion of first longitudinal edge 76 by machining wall 82 and lip 84 into first longitudinal edge 76, such as by removing a portion of honeycomb core 64 and first skin 66. Wall 82 may originate at first skin 66 and may extend through a portion of the thickness of core 64 towards second skin 68. A smaller portion of the core thickness may remain on lip 84, which may extend perpendicularly from wall 82. As shown in FIG. 8, first panel 60 may be a flat panel.

FIG. 9 shows an example of a second panel 62 having a notch 86 formed therein, according to the present disclosure. Honeycomb core 70 may be sandwiched between third skin 72 and fourth skin 74. Notch 86 may be formed along second longitudinal edge 78 by, for example, machining panel 62 along at least a portion of second longitudinal edge 78 to remove portions of second honeycomb core 70 and third skin 72. Notch 86 may include parallel face 88, angled face 90, and third notch face 92. As shown in FIG. 9, second panel 62 may be a curved panel.

FIG. 10 shows a curved second panel 62 having a notch 86 formed along second longitudinal edge 78, as adhesive 99 is being applied within and along at least a portion of notch 86. FIG. 10 shows adhesive 99 in the process of being applied along a portion of the length of second longitudinal edge 78, however, adhesive 99 also may be applied along the entire length of second longitudinal edge 78. Additionally or alternatively, adhesive 99 may be applied along at least a portion of rabbet 80 of first panel 60. In some examples, adhesive 99 may be applied along portions of both rabbet 80 of first panel 60 and notch 86 of second panel 62. In some examples, adhesive 99 may be applied along substantially the entire length of rabbet 80 (e.g., along substantially the entire length of first longitudinal edge 76) and/or adhesive 99 may be applied along substantially the entire length of notch 86 (e.g., along substantially the entire length of second longitudinal edge 78).

Figure 11:
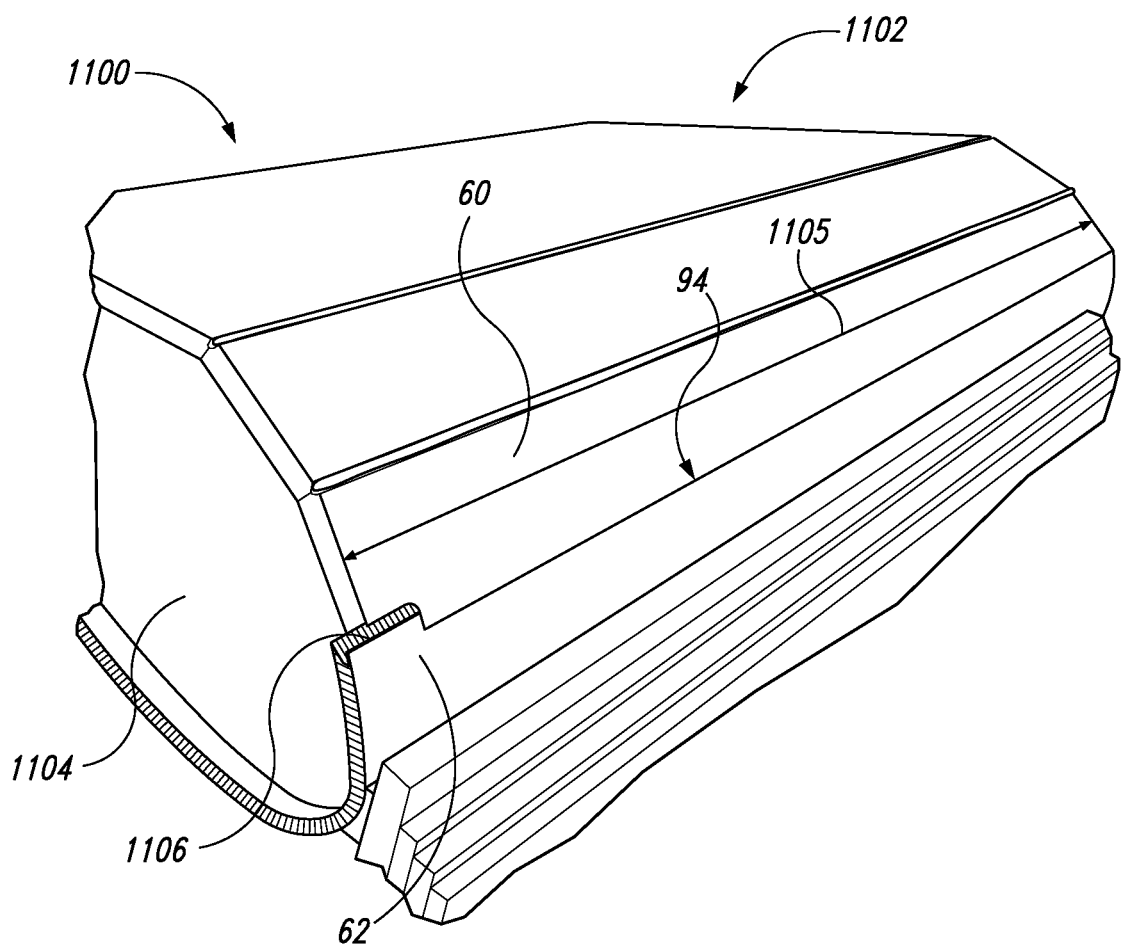
FIG. 11 is a perspective view of an overhead storage bin for an aircraft having a panel joint according to the present disclosure.

FIG. 11 shows an overhead storage bin 1100 (also referred to as bin 1100) for an aircraft, in the process of being manufactured, according to the present disclosure. Bin 1100 generally may include a rounded encapsulating structure 1102 that extends longitudinally to form an elongate capsule (which may be generally cylindrical in shape and/or may have angled or segmented walls forming the elongate capsule) that is capped at the ends by one or more end panels 1104. As visible in FIG. 11, bin 1100 may be manufactured using one or more honeycomb core panels (e.g., one or more panels 60, 62 and/or additional or alternative panels) and joints (e.g., joints 94) between the same, according to the present disclosure. For example, first panel 60 (FIG. 8) and second panel 62 (FIGS. 9-10) may be joined to form joint 94. As seen in FIG. 11, first panel 60 may be a straight, or flat panel (which can be referred to as a batwing panel 60), and second panel 62 may be a curved panel (which can be referred to as a bin face panel). As seen in FIG. 11, joint 94 (which is formed by joining rabbet 80 and notch 86, more clearly visible in FIGS. 8-10) may extend along a longitudinal length 1105 of bin 1100. In some examples, joint 94 (and therefore rabbet 80 and notch 86) may extend along a majority of the entire length of the joint 94 (and therefore along a majority of the entire length of the longitudinal edge of panel 60 forming the rabbet and a majority of the entire length of the longitudinal edge of panel 62 forming the notch). In the example shown in FIG. 11, joint 94 may extend along the entire longitudinal length 1105 of bin 1100 except for one or more tabs 1106 positioned adjacent the end panels 1104. For example, one tab 1106 may be positioned at each end of bin 1100, adjacent each end panel 1104.

Figure 12:
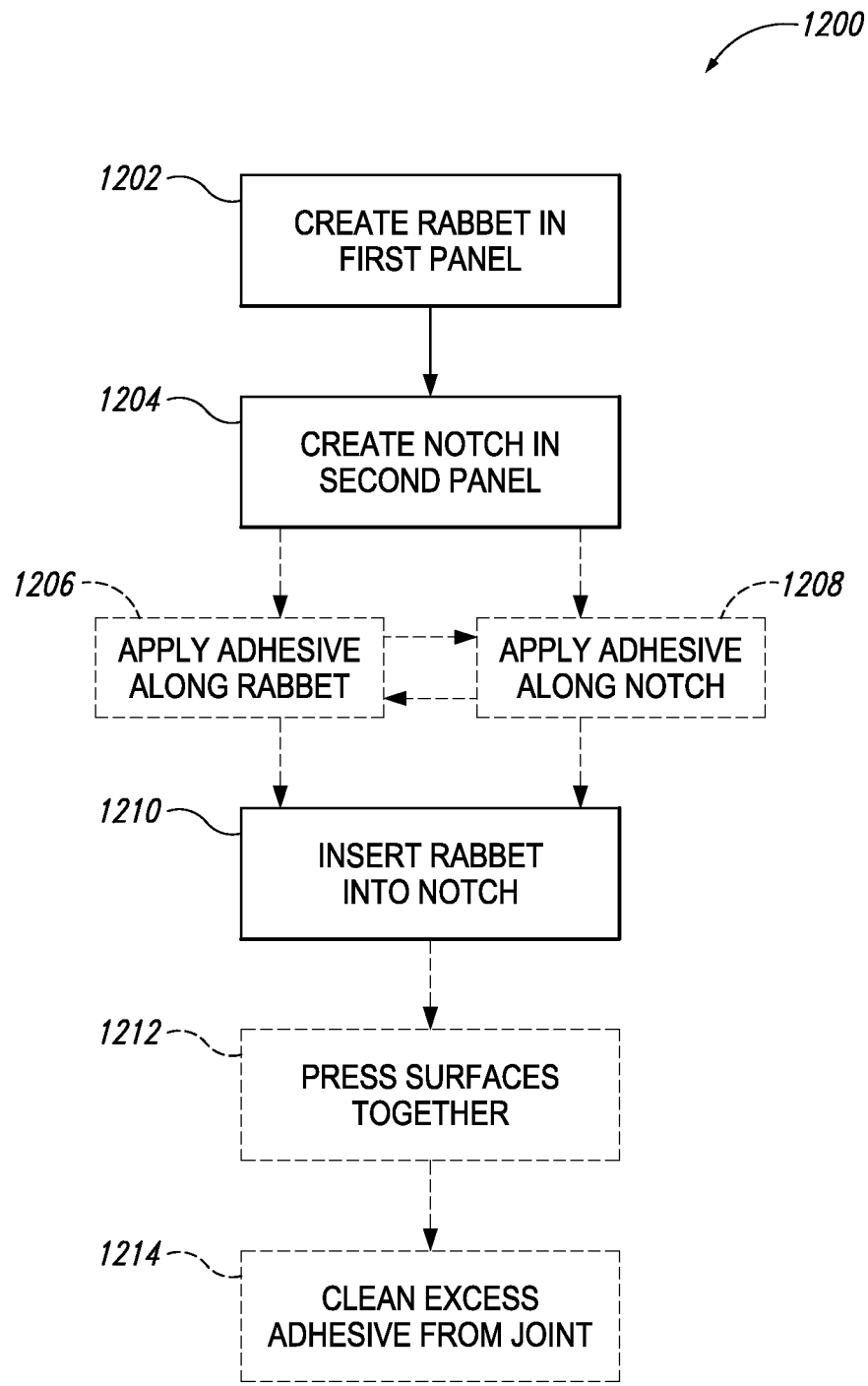
FIG. 12 is a schematic block diagram of illustrative, non-exclusive examples of methods of joining panels according to the present disclosure.

FIG. 12 illustrates a block diagram of illustrative, non-exclusive examples of methods of making joints according to the present disclosure. For example, methods 1200 of forming a joint between a first panel and a second panel are described. The first panel may have a first honeycomb core having a first thickness, the first honeycomb core being sandwiched between a first skin and a second skin. The second panel may have a second honeycomb core having a second thickness, the second honeycomb core being sandwiched between a third skin and a fourth skin. According to disclosed methods, a rabbet can be created along at least a portion of a first longitudinal edge of the first panel at 1202 by removing a first portion of the first honeycomb core and the first skin along the first longitudinal edge of the first panel. Creating the rabbet at 1202 may include one or more of cutting, milling, machining, and scraping the first honeycomb core and the first skin. In some examples, presently disclosed methods may eliminate the need to scrape core from the second skin. For example, some methods of creating a rabbet can result in a portion (e.g., a small thickness) of core remaining on the second skin to form a lip portion of the rabbet. The lip may extend from a wall (e.g., a vertical wall) formed by the first honeycomb core, the wall being perpendicular to the first skin and second skin. The lip may extend perpendicular from the wall, or may extend at some other angle from the wall. The lip may be formed from portions of the second skin and the first honeycomb core. Advantageously machining the rabbet along a straight line according to the present disclosure advantageously may be faster than machining a staggered arrangement of a plurality of fingers and recesses.

Further, a notch can be created at 1204 along at least a portion of a second longitudinal edge of the second panel by removing a portion of the second honeycomb core and the third skin along the second longitudinal edge of the second panel. The notch may include a parallel face that is parallel to the third skin and fourth skin and an angled face. The notch also may include a third notch face disposed between the angled face and the parallel face, connecting the two, to form a notch that can be described as generally V-shaped or U-shaped. The angled face may form an acute angle with the third skin. Creating the notch at 1204 may include one or more of cutting, milling, machining, and scraping the second honeycomb core and the third skin. Advantageously machining the notch along a straight line according to the present disclosure advantageously may be faster than machining a staggered arrangement of a plurality of fingers and recesses.

Methods also may include inserting at least a portion of the rabbet into the notch at 1210 to form the joint between the first panel and the second panel. In some methods, inserting at least a portion of the rabbet into the notch at 1210 may include inserting at least a portion of the lip into the notch. For example, a portion of the second skin may be in contact with the angled face of the notch once the two panels are joined together. In some examples, the rabbet may be inserted all the way into the notch until the lip contacts the notch and is prevented from being further inserted into the notch (e.g., by bringing the lip into contact with the third notch face). In some examples, the rabbet may be inserted partially into the notch such that the lip does not contact the third notch face. In some methods, an intersection of the vertical wall and first skin contacts the parallel face of the notch. This arrangement can essentially form an enclosed space between the rabbet and the notch, wherein an adhesive can be substantially contained.

Prior to or concurrent with inserting the rabbet into the notch at 1210, an adhesive may be applied along at least a portion of the first longitudinal edge at 1206 and/or an adhesive may be applied along at least a portion of the second longitudinal edge at 1208. Advantageously, presently disclosed methods may allow for application of adhesive along a straight line (e.g., along the rabbet and/or along the notch). Such application of adhesive can be more efficient and less time-consuming than methods that require application of adhesive along a non-straight (e.g., staggered) path.

In some methods, the rabbet of the first panel may be pressed into the notch of the second panel at 1212. The third skin of the second panel may be pressed against the lip of the first panel in order to form a tight seal at the joint between the two panels. This interface (e.g., the interior of the joint; the mating of the second skin and third skin) may form part of an interior surface of a storage bin (also referred to as a bin bucket) for an aircraft. This is a highly visible area on many passenger airplanes, and is subject to buckling and rippling when panels are joined using prior art techniques. The presently disclosed methods of joining two or more honeycomb panels together can avoid or reduce this buckling in some examples, which in turn may reduce having to dispose of defective and/or unsightly parts. Some methods can provide for a clean, straight joint appearance on the interior of a storage bin. For example, the notch of the second panel can be machined and configured to receive the lip of the rabbet on the first panel so that buckling of the second skin of the first panel does not occur.

After the first panel and second panel have been assembled together to form a joint, any excess adhesive optionally may be removed or cleaned from the joint at 1214. The joint then may be clamped or otherwise secured to hold the panels in position while the adhesive dries and/or cures.

FIG. 12 schematically provides a flowchart that represents illustrative, non-exclusive examples of methods according to the present disclosure. In FIG. 12, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 12 are not limiting and other methods and steps are within the scope of the present disclosure, including methods having greater than or fewer than the number of steps illustrated, as understood from the discussions herein.

Illustrative, non-exclusive examples of inventive subject matter according to the present disclosure are described in the following enumerated paragraphs:

A1. A joint, comprising:

a first panel having a first honeycomb core having a first thickness, the first honeycomb core being sandwiched between a first skin and a second skin, wherein a first longitudinal edge of the first panel has a rabbet formed along a majority of an entire length of the first longitudinal edge;

a second panel having a second honeycomb core having a second thickness, the second honeycomb core being sandwiched between a third skin and a fourth skin, wherein a second longitudinal edge of the second panel has a notch formed along a majority of an entire length of the second longitudinal edge, wherein at least a portion of the rabbet is positioned within the notch such that the first longitudinal edge and the second longitudinal edge are aligned to form the joint; and an adhesive applied to at least one of the first longitudinal edge and the second longitudinal edge.

A2. The joint of paragraph A1, wherein at least one of the first panel and the second panel is a flat panel.

A3. The joint of paragraphs A1 or A2, wherein at least one of the first panel and the second panel is a curved panel.

A4. The joint of any of paragraphs A1-A3, wherein the second skin of the first panel and the third skin of the second panel are oriented at a joint angle with respect to one another, the joint angle being non-parallel and non-perpendicular.

A5. The joint of paragraph A4, wherein the joint angle is obtuse.

A6. The joint of any of paragraphs A1-A5, wherein the adhesive is substantially contained within a space formed between the notch and the rabbet.

A7. The joint of any of paragraphs A1-A6, wherein the rabbet is defined by a vertical wall cut into the first honeycomb core, the vertical wall originating at the first skin, wherein the vertical wall is perpendicular to the first skin, and wherein the vertical wall extends from the first skin through a first portion of the first thickness of the first honeycomb core.

A8. The joint of paragraph A7, wherein the rabbet includes a lip that extends perpendicularly from the vertical wall, the lip being formed by the second skin and a second portion of the first thickness of the first honeycomb core, the second portion being less than the first portion.

A9. The joint of any of paragraphs A1-A8, wherein the notch is at least one of V-shaped, U-shaped, and trapezoidal.

A10. The joint of any of paragraphs A1-A9, wherein the notch comprises a parallel face that is parallel to the fourth skin and an angled face that is arranged at a notch face angle to the third skin.

A11. The joint of paragraph A10, wherein the notch face angle is acute.

A12. The joint of any of paragraphs A8-A11, wherein the lip of the rabbet of the first panel is positioned within the notch.

A13. The joint of any of paragraphs A10-A12, wherein the lip of the rabbet of the first panel is adjacent the angled face of the notch of the second panel.

A14. The joint of any of paragraphs A10-A13, wherein an intersection of the vertical wall and the first skin is adjacent the parallel face of the notch of the second panel.

A15. The joint of any of paragraphs A10-A14, wherein an engagement portion of the second skin along the lip of the rabbet of the first panel is inserted within the notch of the second panel such that the engagement portion contacts the angled face of the notch of the second panel.

A16. The joint of any of paragraphs A10-A15, wherein the notch further comprises a third notch face that connects the parallel face to the angled face, wherein the angled face originates at the third skin, and the parallel face originates at the fourth skin.

A17. The joint of paragraph A16, wherein the angled face, the parallel face, and the third notch face together form a generally V-shaped notch.

A18. The joint of paragraph A16, wherein the angled face, the parallel face, and the third notch face together form a trapezoidal notch.

A19. The joint of paragraph A16, wherein the angled face, the parallel face, and the third notch face together form a generally U-shaped notch.

B1. An overhead storage bin for an aircraft, the overhead storage bin comprising the joint of any of paragraphs A1-A19.

C1. An aircraft comprising the overhead storage bin of paragraph B1.

D1. A method of forming a joint between a first panel and a second panel, the first panel having a first honeycomb core having a first thickness, the first honeycomb core being sandwiched between a first skin and a second skin, and the second panel having a second honeycomb core having a second thickness, the second honeycomb core being sandwiched between a third skin and a fourth skin, the method comprising:

creating a rabbet along a first longitudinal edge of the first panel by removing a first portion of the first honeycomb core and the first skin along the first longitudinal edge of the first panel;

creating a notch along a second longitudinal edge of the second panel by removing a second portion of the second honeycomb core and the third skin along the second longitudinal edge of the second panel, wherein the notch includes a parallel face that is parallel to the third skin and fourth skin and an angled face, the angled face forming an acute angle with the third skin; and inserting at least a portion of the rabbet into the notch to form the joint between the first panel and the second panel.

D2. The method of paragraph D1, wherein the creating the rabbet comprises one or more of cutting, milling, machining, and scraping the first honeycomb core and the first skin.

D3. The method of any of paragraphs D1-D2, wherein the creating the notch comprises one or more of cutting, milling, machining, and scraping the second honeycomb core and the third skin.

D4. The method of any of paragraphs D1-D3, further comprising applying an adhesive along the first longitudinal edge.

D5. The method of any of paragraphs D1-D4, further comprising applying an adhesive along the second longitudinal edge.

D6. The method of any of paragraphs D1-D5, wherein the creating the rabbet comprises creating a rabbet having a lip extending from a vertical wall formed by the first honeycomb core, the vertical wall being perpendicular to the first skin and second skin, wherein the lip is formed from portions of the second skin and the first honeycomb core.

D7. The method of paragraph D6, wherein the inserting at least a portion of the rabbet into the notch comprises inserting at least a portion of the lip into the notch.

D8. The method of any of paragraphs D6-D7, wherein the inserting at least a portion of the rabbet into the notch comprises inserting the lip into the notch such that a portion of the second skin contacts the angled face of the notch.

D9. The method of any of paragraphs D6-D8, wherein the inserting at least a portion of the rabbet into the notch comprises inserting the rabbet such that an intersection of the vertical wall and first skin contacts the parallel face of the notch.

D10. The method of any of paragraphs D1-D9, further comprising:

applying an adhesive along at least one of the first longitudinal edge and the second longitudinal edge;

pressing the rabbet of the first panel into the notch of the second panel; and removing excess adhesive from the joint.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A joint, comprising:
 a first panel having a first honeycomb core having a first thickness, the first honeycomb core being sandwiched between a first skin and a second skin, wherein a first longitudinal edge of the first panel has a rabbet formed along a majority of an entire length of the first longitudinal edge;
 a second panel having a second honeycomb core having a second thickness, the second honeycomb core being sandwiched between a third skin and a fourth skin, wherein a second longitudinal edge of the second panel has a notch formed along a majority of an entire length of the second longitudinal edge, wherein the notch is formed in the second honeycomb core, between the third skin and the fourth skin, and wherein at least a portion of the rabbet is positioned within the notch such that the first longitudinal edge and the second longitudinal edge are aligned to form the joint; and
 an adhesive applied to at least one of the first longitudinal edge and the second longitudinal edge.

2. The joint according to claim 1, wherein the second skin of the first panel and the third skin of the second panel are oriented at a joint angle with respect to one another, the joint angle being non-parallel and non-perpendicular.

3. The joint according to claim 2, wherein the joint angle is obtuse.

4. The joint according to claim 1, wherein the adhesive is substantially contained within a space formed between the notch and the rabbet.

5. The joint according to claim 1, wherein the rabbet is defined by a wall cut into the first honeycomb core, the wall originating at the first skin, wherein the wall is perpendicular to the first skin, and wherein the wall extends from the first skin through a first portion of the first thickness of the first honeycomb core.

6. The joint according to claim 5, wherein the rabbet includes a lip that extends perpendicularly from the wall, the lip being formed by the second skin and a second portion of the first thickness of the first honeycomb core, the second portion being less than the first portion.

7. The joint according to claim 6, wherein the notch is V-shaped.

8. The joint according to claim 6, wherein the notch comprises a parallel face that is parallel to the fourth skin and an angled face that is arranged at a notch face angle to the third skin, wherein the notch face angle is acute.

9. The joint according to claim 8, wherein the lip of the rabbet of the first panel is positioned within the notch of the second panel.

10. The joint according to claim 9, wherein the lip of the rabbet of the first panel is adjacent the angled face of the notch of the second panel.

11. The joint according to claim 10, wherein an intersection of the wall and the first skin is adjacent the parallel face of the notch.

12. The joint according to claim 11, wherein an engagement portion of the second skin along the lip of the rabbet of the first panel is inserted within the notch of the second panel such that the engagement portion contacts the angled face of the notch of the second panel.

13. The joint according to claim 12, wherein the notch further comprises a third notch face that connects the parallel face to the angled face, wherein the angled face originates at the third skin, and the parallel face originates at the fourth skin.

14. The joint according to claim 13, wherein the first panel is a flat panel and the second panel is a curved panel.

15. A method of forming a joint between a first panel and a second panel, the first panel having a first honeycomb core having a first thickness, the first honeycomb core being sandwiched between a first skin and a second skin, and the second panel having a second honeycomb core having a second thickness, the second honeycomb core being sandwiched between a third skin and a fourth skin, the method comprising:

creating a rabbet along a first longitudinal edge of the first panel by removing a first portion of the first honeycomb core and the first skin along the first longitudinal edge of the first panel;

creating a notch along a second longitudinal edge of the second panel by removing a second portion of the second honeycomb core and the third skin along the second longitudinal edge of the second panel, wherein the notch includes a parallel face that is parallel to the third skin and the fourth skin and an angled face, the angled face forming an acute angle with the third skin; and inserting at least a portion of the rabbet into the notch to form the joint between the first panel and the second panel.

16. The method according to claim 15, wherein the creating the rabbet comprises one or more of cutting, milling, machining, and scraping the first honeycomb core and the first skin, and wherein the creating the notch comprises one or more of cutting, milling, machining, and scraping the second honeycomb core and the third skin.

17. The method according to claim 15, further comprising applying an adhesive along one or more of the first longitudinal edge and the second longitudinal edge.

18. The method according to claim 15, wherein the creating the rabbet comprises creating a rabbet having a lip extending from a wall formed by the first honeycomb core, the wall being perpendicular to the first skin and second skin, wherein the lip is formed from portions of the second skin and the first honeycomb core, and wherein the inserting at least a portion of the rabbet into the notch comprises inserting the lip into the notch such that a portion of the second skin contacts the angled face of the notch.

19. The method according to claim 18, further comprising:

applying an adhesive along at least one of the first longitudinal edge and the second longitudinal edge;

pressing the rabbet of the first panel into the notch of the second panel; and removing excess adhesive from the joint.

20. The method according to claim 19, wherein the first panel is a flat panel and the second panel is a curved panel.

* * * * *